(12) United States Patent
Yamaguchi et al.

(10) Patent No.: US 7,869,128 B2
(45) Date of Patent: Jan. 11, 2011

(54) HEAD MOUNTED DISPLAY

(75) Inventors: Hiroshi Yamaguchi, Suita (JP); Yasushi Tanijiri, Osakasayama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 253 days.

(21) Appl. No.: 12/067,770

(22) PCT Filed: Aug. 30, 2006

(86) PCT No.: PCT/JP2006/317039

§ 371 (c)(1),
(2), (4) Date: Mar. 21, 2008

(87) PCT Pub. No.: WO2007/037089

PCT Pub. Date: Apr. 5, 2007

(65) Prior Publication Data

US 2009/0180194 A1    Jul. 16, 2009

(30) Foreign Application Priority Data

Sep. 27, 2005  (JP) ............................. 2005-279933

(51) Int. Cl.
*G02B 27/14* (2006.01)
(52) U.S. Cl. ........................ 359/630; 359/643
(58) Field of Classification Search ................ 359/630
See application file for complete search history.

(56) References Cited

U.S. PATENT DOCUMENTS 5,539,422 A    7/1996  Heacock et al.
2001/0038361 A1 *  11/2001  Tanijiri et al. ................ 345/8
2004/0113867 A1    6/2004  Tomine et al.

FOREIGN PATENT DOCUMENTS

| JP | 8-509075 A | 9/1996 |
| JP | 10-293265 A | 11/1998 |
| JP | 2000-235164 A | 8/2000 |

(Continued)

OTHER PUBLICATIONS

WO 2007/037089 A1, concerning International Application No. PCT/JP2006/317039, cites the following documents in the order that they appear in the International Search Report (ISR) with translation.

*Primary Examiner*—Jordan M. Schwartz
*Assistant Examiner*—James C Jones
(74) *Attorney, Agent, or Firm*—Sidley Austin LLP

(57) ABSTRACT

An object of the present invention is to provide a head mounted display capable of an accurate display of a surrounding situation always without affecting the display section even if a frame is deflected, and giving a comfortable mounting feeling as well as easy mounting. For this purpose, the head mounted display comprises: a support member including a pair of lateral frames contacting both of a user's head and a front frame in front of a user's face to contact a user's nose; an image display device for displaying an image; an eyepiece optical system provided in front of an eye of the user to lead the image displayed on the image display device to the user's eye; and a connection section which connects the eyepiece optical system with the front frame at a position corresponding to a center position in a lateral direction of the user's face.

27 Claims, 6 Drawing Sheets

FOREIGN PATENT DOCUMENTS

| | | |
|---|---|---|
| JP | 2002-90687 A | 3/2002 |
| JP | 2002-258210 A | 9/2002 |
| JP | 2003-46903 A | 2/2003 |
| JP | 2004-61804 A | 2/2004 |
| JP | 2004-226619 A | 8/2004 |

* cited by examiner

HEAD MOUNTED DISPLAY

RELATED APPLICATIONS

This application is a National Stage of International Application No. PCT/JP2006/317039, filed Aug. 30, 2006, which is based on Japanese Patent Application No. 2005-279333 filed with Japanese Patent Office on Sep. 27, 2005, the entire content of which is incorporated herein by reference.

TECHNICAL FIELD

The present invention relates to a head mounted display (HMD).

BACKGROUND

Recent years have witnessed the development of the Head Mounted Display (HMD) for viewing images appearing on the screen of a display unit mounted on a human head or images from a personal computer (PC). This HMD allows images to be viewed at a desired place without affecting the surrounding. This HMD provides a comfortable mounting feeling and is characterized by light weight, easy mounting and dismounting and excellent portability.

Further, earphones are equipped in some of the image display devices of this type. Such devices are exemplified by a head mounted display characterized by light weight and easy mounting, wherein the earphones are fixed in the vicinity of the side frame so as to prevent entanglement of earphone cables (Patent Document 1).

Patent Document 1: Unexamined Japanese Patent Application Publication No. 2000-235164

DISCLOSURE OF THE INVENTION

Object of the Invention

Incidentally, in recent years there has been an ever-widening range of applications of the aforementioned head mounted display, which is employed as an information display apparatus to display navigation by the GPS mounted thereon, or to distribute information using a IC tag. This trend is directly connected with a further effort for lighter weight, easier mounting, and more accurate display of the surrounding. As the head mounted display to be used as an information display apparatus is mainly used as a mobile device, it is important that the head mounted display should have the appearance similar to that of the commonly used spectacles or sunglasses, and should be designed as a see-through configuration that permit viewing of the external world. Further, this head mounted display may be used by a great variety of people having different sizes of faces and heads. Thus, the frame may be bent depending on the sizes of the face and head of the user. In conventional image display devices, the display section connected to the frame is displaced by the bending of the frame, and the video on the display section is disturbed, with the result that accurate view of the displayed image cannot be obtained. Further, to prevent bending of the display section the display section is designed in a rigid structure, and this has increased size of the display section.

In the head mounted display disclosed in the Patent Document 1, the display section is installed outside the frame, and hence the disturbance of the image caused by the bending of the frame can be avoided. However, there is a problem that the frame is brought in contact with the display section due to the bending of the frame. Further, since this display is used mainly as a mobile device, it is important that the head mounted display should have the appearance similar to that of sunglasses wherever possible. However, since the display section is located outside, the appearance of this display is not similar to that of the commonly used eyeglasses or sunglasses. In this sense, the appearance of this display has not been favorably accepted.

Against this backdrop, an object of the present invention is to provide a head mounted display which ensures an accurate display of the surrounding at all times without the display section being affected by possible bending of the frame, this head mounted display providing a comfortable mounting feeling, and being characterized by easy mounting. A further object of the present invention is to provide a head mounted display which is similar in appearance to commonly employed eyeglasses or sunglasses, and is designed as a see-through configuration that permit viewing of the external world, in anticipation that this display is used as a mobile device.

Means for Solving the Object

To solve the aforementioned problems, the invention described in claim 1 is characterized in comprising:

a support member; the support member including:

a pair of lateral frames which are configured to come into contact with both sides of a head of a user; and a front frame which is provided in front of a face of the user and is configured to come into contact with a nose of the user, an image display device for displaying an image;

an eyepiece optical system provided in front of an eye of the user to lead the image displayed on the image display device to the user's eye; and a connection section which connects the eyepiece optical system with the front frame at a position corresponding to a center position in a lateral direction of the user's face.

The invention described in claim 2 is characterized in that in the head mounted display of claim 1, the eyepiece optical system is disposed on a face side of the front frame, and a transparent plate for covering the eyepiece optical system is provided on a counter-face side of the eyepiece optical system.

The invention described in claim 3 is characterized in that in the head mounted display of claim 2, a plurality of the transparent plates are individually provided for each of right and left eyes of the user.

The invention described in claim 4 is characterized in that in the head mounted display of claim 2, the transparent plate is integrally formed to cover right and left eyes of the user.

The invention described in claim 5 is characterized in that in the head mounted display of claim 1, wherein a plurality of the image display devices are individually provided right and left.

The invention described in claim 6 is characterized in that in the head mounted display of any one of claims 2 to 4, the transparent plate is detachably attached.

The invention described in claim 7 is characterized in that in the head mounted display of any one of claims 1 to 6, the eyepiece optical system has an optical pupil larger than a pupil of the user's eye.

The invention described in claim 8 is characterized in that in the head mounted display of any one of claims 1 to 7, the eyepiece optical system combines an image light beam from the image displayed on the image display device with an external light beam in front of the user's eye into a combined light beam, and leads the combined light beam to the user's eyes.

The invention described in claim 9 is characterized in that in the head mounted display of any one of claims 1 to 8, the eyepiece optical system includes:

a first transparent optical element which totally reflects and leads the image light beam to the eye of the user; and a second transparent optical element.

The invention described in claim 10 is characterized in that the head mounted display of any one of claims 1 to 9 comprises:

a volume phase holographic optical element which reflects the image light beam from the image to combine the image light beam with the external light beam in front of the user's eye.

The invention described in claim 11 is characterized in that in the head mounted display of claim 10, the holographic optical element has an axially asymmetric positive optical power.

The invention described in claim 12 is characterized in that the head mounted display of any one of claims 1 to 11 comprises:

a dioptric lens appropriate for vision of the user's eye provided between the eyepiece optical system and the user's eye.

The invention described in claim 13 is characterized in that the head mounted display of claim 12 comprises:

a dioptric lens supporting member for supporting the dioptric lens, the dioptric lens supporting member being attached to the connection section in a vicinity of a center position of the user's face.

The invention described in claim 14 is characterized in that in the head mounted display of claim 12 or 13, the dioptric lens is detachably supported.

The invention described in claim 15 is characterized in that the head mounted display of any one of claims 1 to 14 comprises:

an earphone for providing the user with audio information.

The invention described in claim 16 is characterized in that in the head mounted display of claim 1, the eyepiece optical system includes a right eye eyepiece optical system and a left eye eyepiece optical system, and the connection section connects the right eye eyepiece optical system with the left eye eyepiece optical system.

The invention described in claim 17 is characterized in that the head mounted display of claim 1 comprises:

a nose pad supported by the connection section, wherein the front frame comes into contact with the user's nose through the nose pad.

The invention described in claim 18 is characterized in comprising:

a support member; the support member including:

a plurality of contact portions which are configured to come into contact with a head of a user at three points including a vicinity of a nose of the user, an image display device for displaying an image;

an eyepiece optical system provided in front of an eye of the user to lead the image displayed on the image display device to the user's eye; and a connection section which connects the eyepiece optical system with the contact portion which is to come into contact with the head in the vicinity of the user's nose.

The invention described in claim 19 is characterized in that in the head mounted display of claim 18, the eyepiece optical system is disposed on a face side of the support member, and a transparent plate for covering the eyepiece optical system is provided on a counter-face side of the eyepiece optical system.

The invention described in claim 20 is characterized in that in the head mounted display of claim 18, a plurality of the image display devices are individually provided right and left.

The invention described in claim 21 is characterized in that in the head mounted display of any one of claims 18 to 20, the eyepiece optical system combines an image light beam from the image displayed on the image display device with an external light beam in front of the user's eye into a combined light beam, and leads the combined light beam to the user's eye.

The invention described in claim 22 is characterized in that in the head mounted display of any one of claims 18 to 21, the eyepiece optical system includes:

a first transparent optical element which totally reflects and leads the image light beam to the eye of the user; and a second transparent optical element.

The invention described in claim 23 is characterized in that the head mounted display of any one of claims 18 to 22, comprises:

a volume phase holographic optical element which reflects the image light beam from the image to combine the image light beam with the external light beam in front of the user's eye.

The invention described in claim 24 is characterized in that the head mounted display of any one of claims 18 to 23 comprises:

a dioptric lens appropriate for vision of the user's eye provided between the eyepiece optical system and the user's eye.

The invention described in claim 25 is characterized in that in the head mounted display of claim 18, the eyepiece optical system includes a right eye eyepiece optical system and a left eye eyepiece optical system, and the connection section connects the right eye eyepiece optical system with the left eye eyepiece optical system.

The invention described in claim 26 is characterized in that in the head mounted display of claim 18, the contact portion which is to come into contact with the head in the vicinity of the nose of the user includes a nose pad, and the support member comes into contact with the user's nose through the nose support member.

EFFECTS OF THE INVENTION

According to the invention described in claim 1, the eyepiece optical system is supported at the center position in the lateral direction of the face of the user. This arrangement ensures that the eyepiece optical system is not affected by possible deformation of the front frame section due to the size of the face or head of the user. This eliminates the possibility of misalignment caused between the position of the user's eyes and the direction of the image led by the eyepiece optical system, and provides the user with a clear image. Further, the eyepiece optical system is supported at the center. This arrangement prevents the external light from being interrupted and allows the user to view the external world over an extensive range.

According to the invention described in claims 2 through 4, the transparent plate covering the eyepiece optical system is provided. This makes it possible for the display to look like commonly used eyeglasses or sunglasses.

According to the invention described in claim 5, the eyepiece optical system is each located right and left so that the video can be observed by both eyes, with the result that the displayed image and information can be viewed with higher accuracy.

According to the invention described in claim 6, the transparent plate is detachably mounted so that the transparent plate and optical element can be cleaned. Further, it is possible to select and mount the transparent plate conforming to the brightness of the operation environment and user's taste. This enhances the degree of freedom for the user.

According to the invention described in claim 7, the optical pupil led by the eyepiece optical system is larger than the user's pupil. This arrangement allows the user to view the image more reliably.

According to the invention described in claim 8, the user can view the image light superimposed on the external light. This allows the user to observe the external world while obtaining information from the image light.

According to the invention described in claim 9, the need of installing a half mirror leading the image light is eliminated by using the optical element that leads the image light to the eyes by total reflection. Thus, the transmittance of the external light is increased so that the bright external field can be observed. Further, since the light is led to the eyes by reflection in the optical element, the optical element can be small, and the thickness of the optical element does not affect, the user can wear the display close to his face. Thus, downsizing of the head mounted display can be achieved.

According to the invention described in claim 10, the image light is totally reflected by the volume phase holographic optical element, and the external light can be transmitted with a high degree of light transmittance. Thus, the image light and external light are superimposed upon each other and are led to the eyes, with the result that the user is allowed to view a bright external world while obtaining information from the image light. This arrangement allows the head mounted display to be placed just before the eyes, and to be mounted close to the face. Further, downsizing of the head mounted display can be achieved.

According to the invention described in claim 11, the volume phase holographic optical element has axially asymmetric positive optical power. This arrangement increases the degree of freedom of arrangement and allows the head mounted display to be mounted just before the eyes close to the face, with the result that the head mounted display is further characterized by good appearance, light weight and reduced size.

According to the invention described in any one of claims 12, 13 and 14, the dioptric lens can be mounted between the user's eyes and the optical element. This ensures the image and external world to be observed even by the user of poor vision. Further, the dioptric lens can be replaced so that a dioptric lens selected to conform to the vision of the user can be mounted. This makes it possible to produce a head mounted display of enhanced versatility.

According to the invention described in claim 15, sound can be outputted through earphones. This allows the user to view the image and to listen to the sound simultaneously. Thus, the user can enjoy the sound as well as the impressive image appearing before the eyes. This means that the user is able to enjoy a movie and other entertainments.

According to the invention described in claim 16, the image light from the image display device can be led to both eyes, and thus, a greater amount of information can be obtained with high accuracy. Further, right and left optical systems are mounted on the front frame through a connection member, and this arrangement ensures well-balanced mounting.

According to the invention described in claim 17, the nose pad is held in position by the front frame to which the eyepiece optical system is connected by means of the connection member. This ensures stable mounting without giving discomfort to the user.

According to the invention described in claim 18, the eyepiece optical system is supported by the support member which is connected to the eyepiece optical system by means of the connection section and contains contact portions which are brought into contact with the user's head at three points including the position close to the user's nose. Thus, the eyepiece optical system is not affected by the possible deformation of the support member due to big faces and heads of the users. This arrangement eliminates the possibility of misalignment in the position of the user's pupils and the direction of the image led by the eyepiece optical system, and allows the user to view clear images. Further, the eyepiece optical system is supported close to the nose, and therefore, the user is allowed to observe the external world over an extensive range without the external light being interrupted.

According to the invention described in claim 19, a transparent plate covering the eyepiece optical system is mounted. This makes it possible for the display to look like commonly used eyeglasses or sunglasses.

According to the invention described in claim 20, the eyepiece optical systems are each located on the right and left sides so that the image can be observed by both eyes, with the result that the displayed image and information can be viewed more reliably.

According to the invention described in claim 21, the user can view the image light superimposed on the external light. This allows the user to observe the external world while obtaining information from the image light.

According to the invention described in claim 22, the need of installing a half mirror leading the image light is eliminated by using the optical element that leads the image light to the eyes by total reflection. Thus, the transmittance of the external light is increased so that the bright external field can be observed. Further, since the light is led to the eyes by reflection in the optical element, the optical element is small, and the thickness of the optical element does not affect, the user can wear the display close to his face. Thus, downsizing of the head mounted display can be achieved.

According to the invention described in claim 23, the image light is totally reflected by the volume phase holographic optical element, and the external light can be transmitted with a high degree of light transmittance. Thus, the image light and external light are superimposed upon each other and are led to the eyes, with the result that the user is allowed to view a bright external world while obtaining information from the image light. This arrangement allows the head mounted display to be placed just before the eyes, and to be mounted close to the face. Further, downsizing of the head mounted display can be achieved.

According to the invention described in claim 24, a dioptric lens can be mounted between the user's eyes and optical element. This ensures the image and external world to be observed even by the user of poor vision.

According to the invention described in claim 25, the image light from the image display device can be led to both eyes, and thus, a greater amount of information can be obtained with high accuracy. Further, right and left optical systems are mounted on the support member through a connection member, and this arrangement ensures well-balanced mounting.

According to the invention described in claim 26, the nose pad is held in position by the support member to which the eyepiece optical system is connected by means of the connection member. This ensures stable mounting without giving discomfort to the user.

LEGEND

Figure 1:
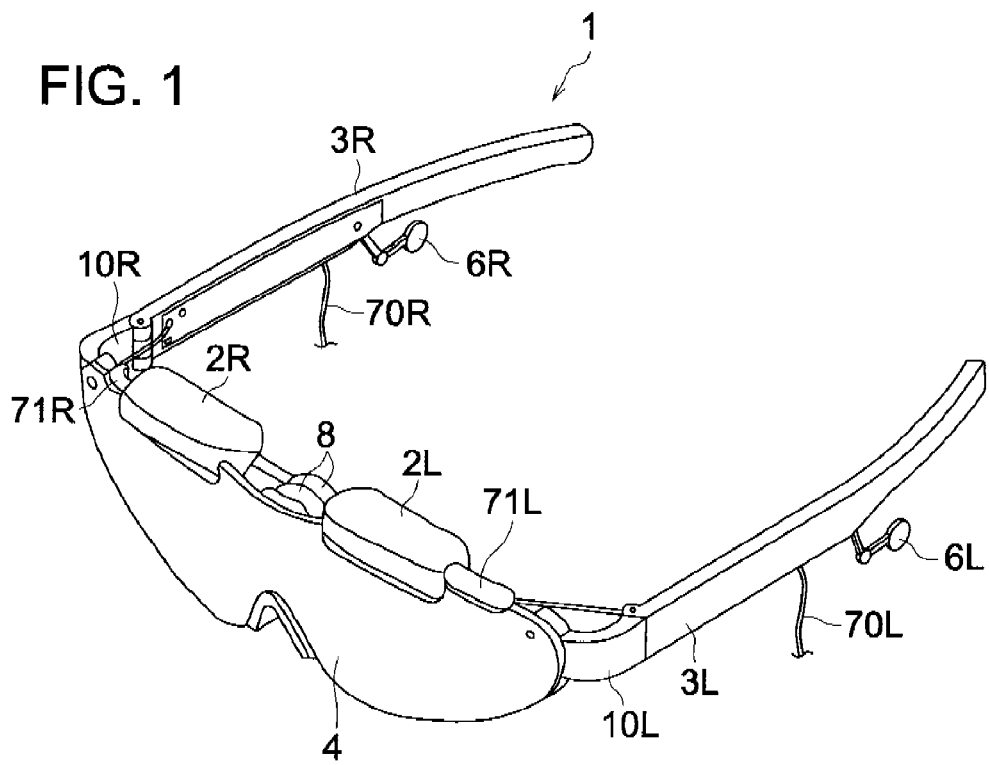
FIG. 1 is a perspective view of a head mounted display according to the present embodiment as viewed from the front side.

1 Head mounted display
2R, 2L Display units
3R, 3L Side frames
4 Dark transparent plate
5 Nose pad
6R, 6L Earphones
70R, 70L Cables
71R, 71L Cable protective members
8 Connection member
9R, 9L Prisms
10R, 10L Hinge section
11 Frame
20 Enclosure
21 Light source
22 Uni-directional diffusion plate
23 Collective lens
24 Display panel
251 First prism
252 Second prism
26 Volume phase holographic optical element
28 Optical pupil
30 Dioptric lens
31 Dioptric lens supporting member

BEST MODE FOR CARRYING OUT THE INVENTION

Referring to the drawings, the following describes the details of the embodiments of the head mounted display of the present invention, without the present invention being restricted thereto. The embodiments of the present invention represent the best forms of the invention without the terminologies of the present invention being restricted thereto.

Figure 2:
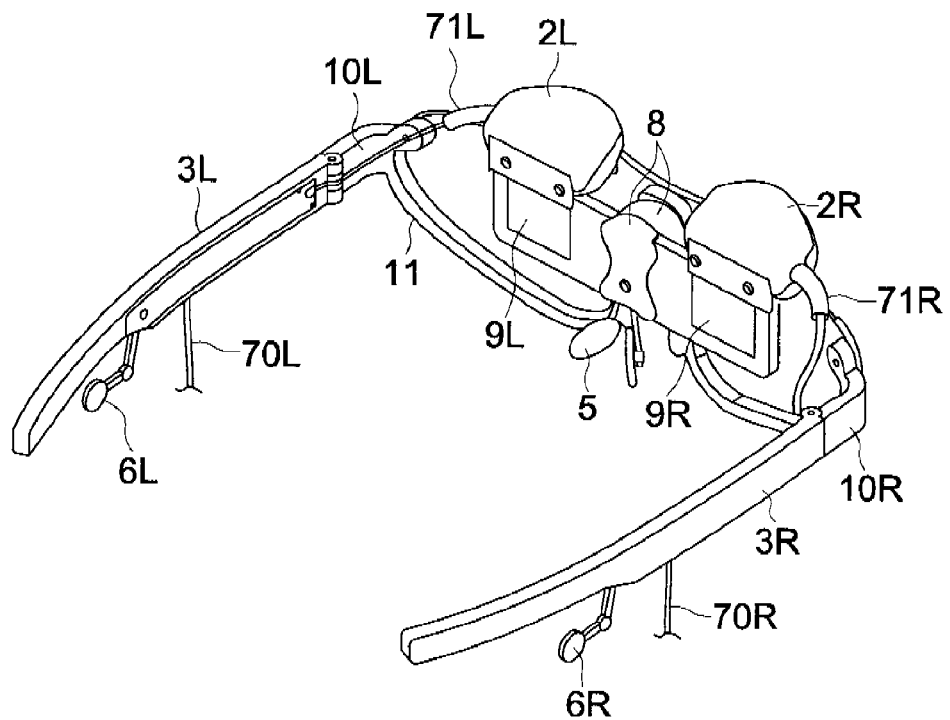
FIG. 2 is a perspective view of a head mounted display according to the present embodiment as viewed from the mounted side.
Figure 3:
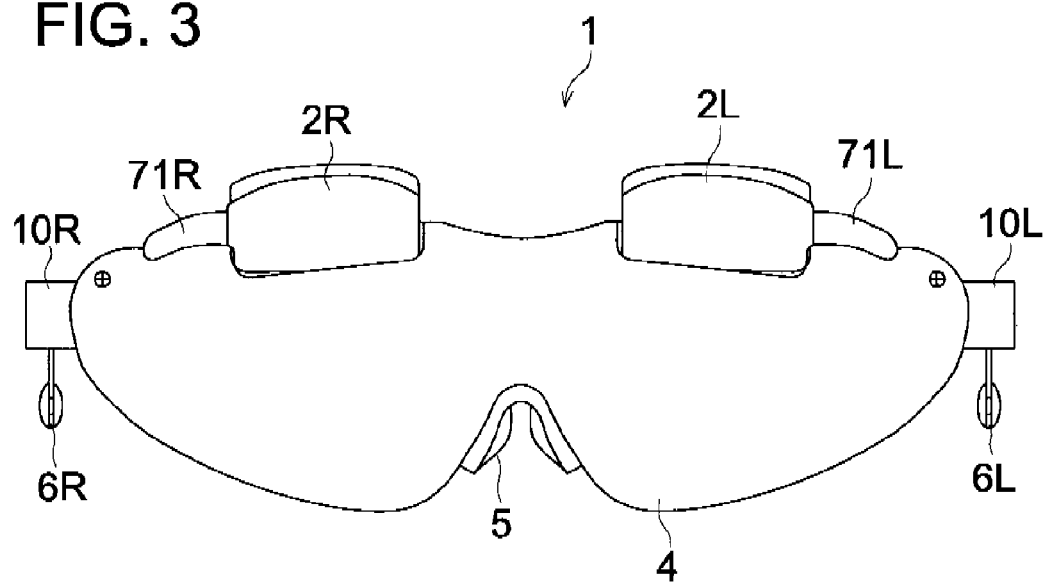
FIG. 3 is a front view of a head mounted display according to the present embodiment.
Figure 4:
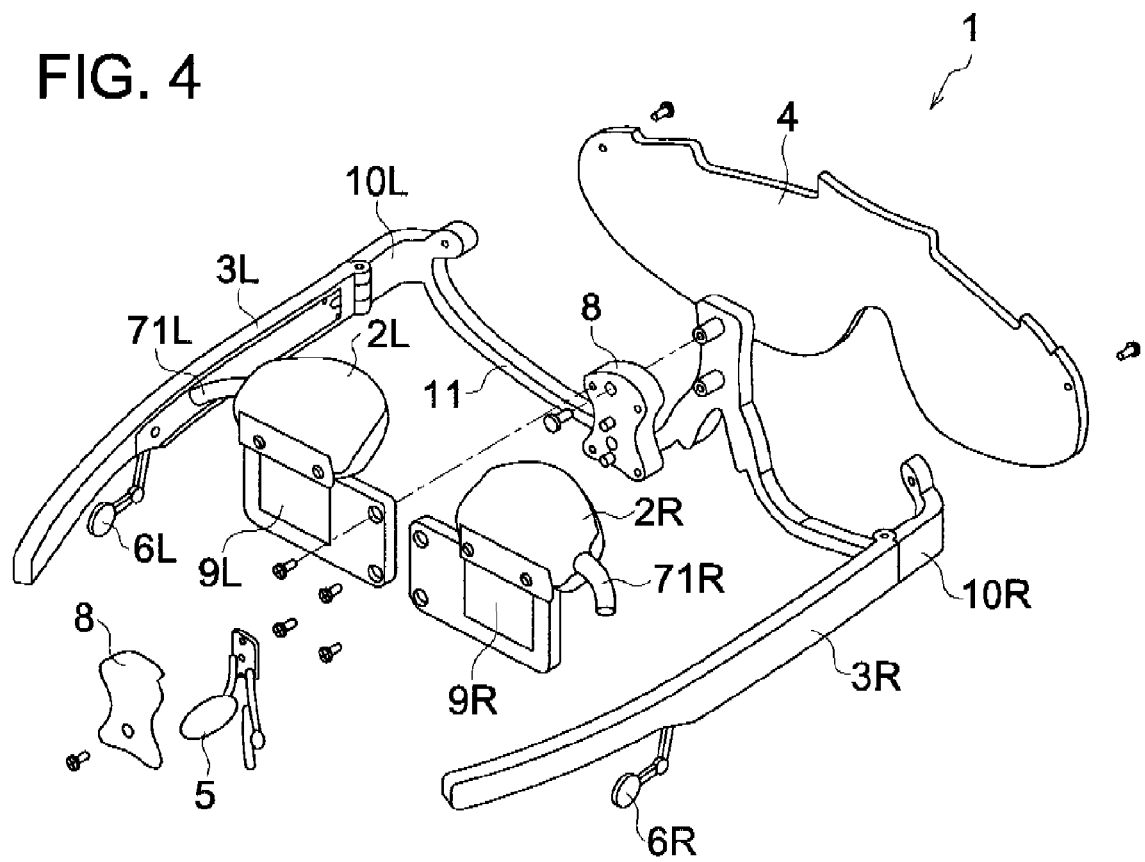
FIG. 4 is an exploded perspective view of a head mounted display according to the present embodiment as viewed from the mounted side.

The Head Mounted Display (HMD) of the present embodiment will be described with reference to FIGS. 1 through 4. In the following description, the head mounted display 1 will be referred to as HMD 1. FIGS. 1 and 2 are perspective views of the HMD 1, FIG. 3 is a front view and FIG. 4 is an exploded perspective view. The same portions in the drawings will be assigned with the same reference numerals.

As illustrated, the HMD 1 includes display units 2R and 2L, side frames 3R and 3L as lateral frames, frame 11 as a front frame, nose pad 5, earphones 6R and 6L, cables 70R and 70L, connection member 8 as a connection section, prisms 9R and 9L as eyepiece optical systems, hinge members 10R and 10L, dark transparent plate 4 over which display units 2R and 2L are mounted, and a control apparatus (not illustrated). The HMD 1 is mounted on the face of the user so that the prisms 9R and 9L and dark transparent plate 4 are located in this order from the right and left eyes.

The side frames 3R and 3L are the supporting members for supporting the HMD 1 on the user's head. The user applies each of the side frames 3R and 3L on the right and left ears through the temporal part of the head, and puts the nose pad 5 on the base of his nose. Then each of the prisms 9R and 9L mounted on the connection member 8 is stably placed before the right and left eyes. Further, the side frames 3R and 3L and nose pad 5 each contains an elastic member to reduce the load on the user when used for a long period of time.

The control apparatus (not illustrated) includes a control section provided with a CPU (Central Processing Unit), ROM (Read Only Memory) and RAM (Random Access Memory); a storage section for storing the program to be executed by the control section and the data required for processing by using the nonvolatile memory; an image information storage section for storing images by means of a hard disk apparatus and others; and a communication section for exchanging data with an external device. The control section applies predetermined image processing to the image information stored in the image information storage section, and outputs the result to the display units 2R and 2L as image display devices. In the HMD 1 as the present embodiment, this control apparatus and display units 2R and 2L are connected communicably through cables 70R and 70L. The cables 70R and 70L are communication media for electrical connection between the control apparatus and display units 2R and 2L.

The control apparatus is described as having been designed for data communication through the cables 70R and 70L. However, the control apparatus and display units 2R and 2L are not restricted thereto. For example, the control apparatus and display units 2R and 2L each can be provided with radio communication function to perform radio data communication. This arrangement eliminates the possibility of the user being caught by the cables 70R and 70L which are freely movable. Further, the connection between the display units 2R and 2L and cables 70R and 70L are protected by the cable protective sections 71R and 71L, respectively.

The display units 2R and 2L are image display devices for supplying the user with images as image light. The prisms 9R and 9L as eyepiece optical systems mounted on the display units 2R and 2L each leads to the user's eyes the images superimposed on the external light before the eyes of the user. These prisms 9R and 9L are mounted on the display units 2R and 2L, respectively. When the HMD 1 is worn by the user, they are located before the right and left eyes. Further, these prisms 9R and 9L are connected by the connection member 8 as a connection section that connects and fixes them close to the center of the user's face. The prisms 9R and 9L will be described later. The display units 2R and 2L equipped with these prisms 9R and 9L are located on the right and left sides of the top of the dark transparent plate 4 as a transparent member arranged in front of the right and left eyes. Accordingly, as shown in FIG. 3, when the HMD 1 is worn by the user, only the display units 2R and 2L and dark transparent plate 4 can be observed from a third person. Thus, the HMD 1 can be worn comfortably as if commonly employed sunglasses are worn.

The connection member 8 used for connection of the prisms 9R and 9L is equipped with a nose pad 5. Thus, when the HMD 1 is worn by the user, the nose pad 5 comes into contact with the nose, and the side frames 3R and 3L come into contact with the ears, temporal parts or occipital part of the head. The HMD 1 is supported by them. The side frames 3R and 3L can be rotated about the hinge members 10R and 10L installed close to the dark transparent plate 4. The hinge members 10R and 10L will be described later.

The dark transparent plate 4 is held in position by fixing both ends on the top of the frame 11. This frame 11 is shaped to support the bottom and center of the dark transparent plate 4. The aforementioned connection member 8 is fixed at the center by means of a fixing member. Thus, the display units 2R and 2L, prisms 9R and 9L, and nose pad 5 are integrally fixed by the connection member 8 at the center of the user's face. Part of the display units 2R and 2L, and the cable protective sections 71R and 71R are kept in contact with the dark transparent plate 4, however, the contact is so slight that the deflection of the dark transparent plate 4 does not affect.

The one ends of the hinge members 10R and 10L are attached to opposite ends of the frame 11. The other ends of the hinge members 10R and 10L are connected with the side frames 3R and 3L. Both ends of the dark transparent plate 4 are mounted on the side, of the both end of the frame 11, opposite to the side wherein hinge members 10R and 10L are mounted. The side frames 3R and 3L are mounted such that they can be folded inside by means of the hinge members 10R and 10L from the position approximately perpendicular to the frame 11 to be overlapped each other, without opening to the outside, and to sandwich the frame 11 with the dark transparent plate 4.

The dark transparent plate 4 needs not to be perfectly transparent. It is only required to have a light transmittance of about 5 through 50 percent. For example, when using the dark transparent plate 4 having a light transmittance of about 5 percent, much of the external light is blocked, and therefore, the image light led from the prisms 9R and 9L to the eyes is clearly visible. However, when it is used outside during the night time, the surrounding world viewed through the prisms 9R and 9L is not very clearly visible while the image light led to the eyes is clearly visible. When the dark transparent plate 4 having a transmittance of 50 percent is used, on the other hand, the surrounding world is clearly visible, but the image light led to the eyes through the prisms 9R and 9L is not very clear under the adverse effect of the external light. To solve such a problem, the dark transparent plate 4 to be adopted is the one that can be mounted and dismounted and can be replaced in conformity to the surrounding situation and conditions of use. There is no particular restriction to the shape of the dark transparent plate 4. Thus, the user selects the best shape from among various shapes of dark transparent plates 4 in conformity to the hair style so that the HMD 1 having the favorite appearance can be obtained.

The shape of the dark transparent plate 4 of the present embodiment is made of one transparent member, as described above. However, without being restricted thereto, it is also possible to use the dark transparent plate 4 made of the transparent members separated on the right and left.

The earphones 6R and 6L are arranged on the bottom surface close to the center of the side frames 3R and 3L. When sound is outputted through the earphones 6R and 6L, a movie made up of a video image and sound can be viewed in this HMD 1 for example. Further, in the HMD 1 equipped with a GPS, sound guidance can be provided in conformity to the navigation by image. Thus, when the sound guidance is produced from the earphones 6R and 6L, effective navigation can be provided.

As described above, display units 2R and 2L are supported close to the center of the face by the connection member 8 and nose pad 5 mounted thereon, without these display units 2R and 2L being mounted directly on the frame 11. This ensures that the display units 2R and 2L are free from deformation even if the side frames 3R and 3L as the support member on the head have been deformed depending on the size of the head. Thus, the prisms 9R and 9L installed on the display units 2R and 2L to lead the image light to the eyes are not affected by the deflection of the frame. This eliminates the possibility of causing misalignment of the pupil's position and image direction so that the user is supplied with a clearly visible image. This arrangement allows the HMD 1 to be employed by any user independently of the age or sex, and provides an HMD characterized by versatility. Further, the image light superimposed on the external light can be observed by means of the prisms 9R and 9L. Thus, the user is allowed to observe the image light and external world over an extensive range, without the external light being interrupted.

The dark transparent plate 4 has a transmittance of 5 through 50 percent. For example, the dark transparent plate 4 having a lower transmittance is used when the image is viewed in a bright place. This enhances the visibility of the image light. Further, the dark transparent plate 4 can be mounted and dismounted, and therefore, can be replaced by a transparent plate having a shape conforming to the taste of the user. This arrangement increases the degree of freedom for the user. Further, the structure that permits mounting and dismounting makes it easier to clean the dark transparent plate 4 and prisms 9R and 9L. Thus, the user is allowed to employ the HMD 1 which is kept clean at all times to provide excellent viewing conditions.

Figure 5:
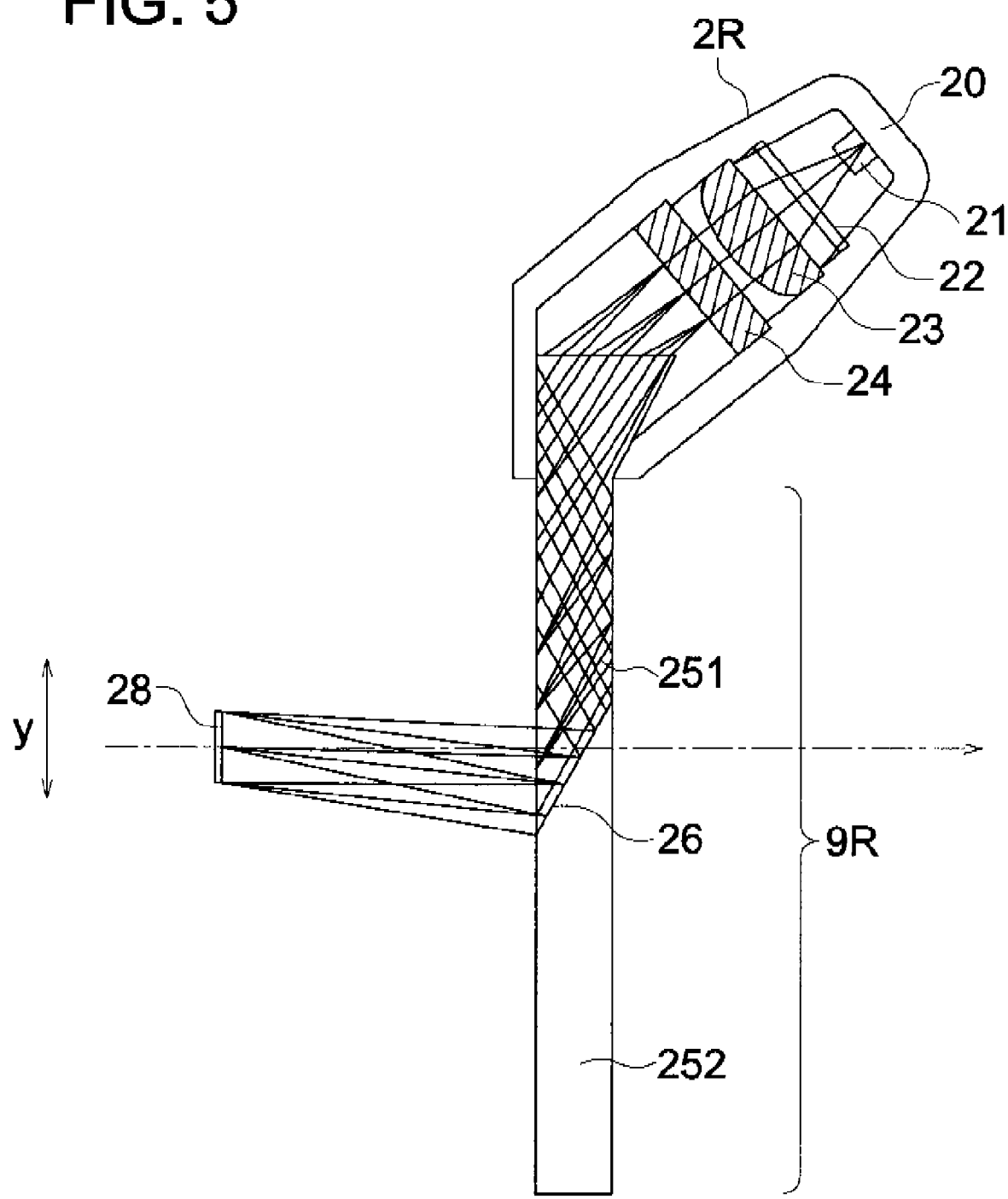
FIG. 5 is a cross sectional view representing the display unit and prism constituting a head mounted display according to the present embodiment.
Figure 6:
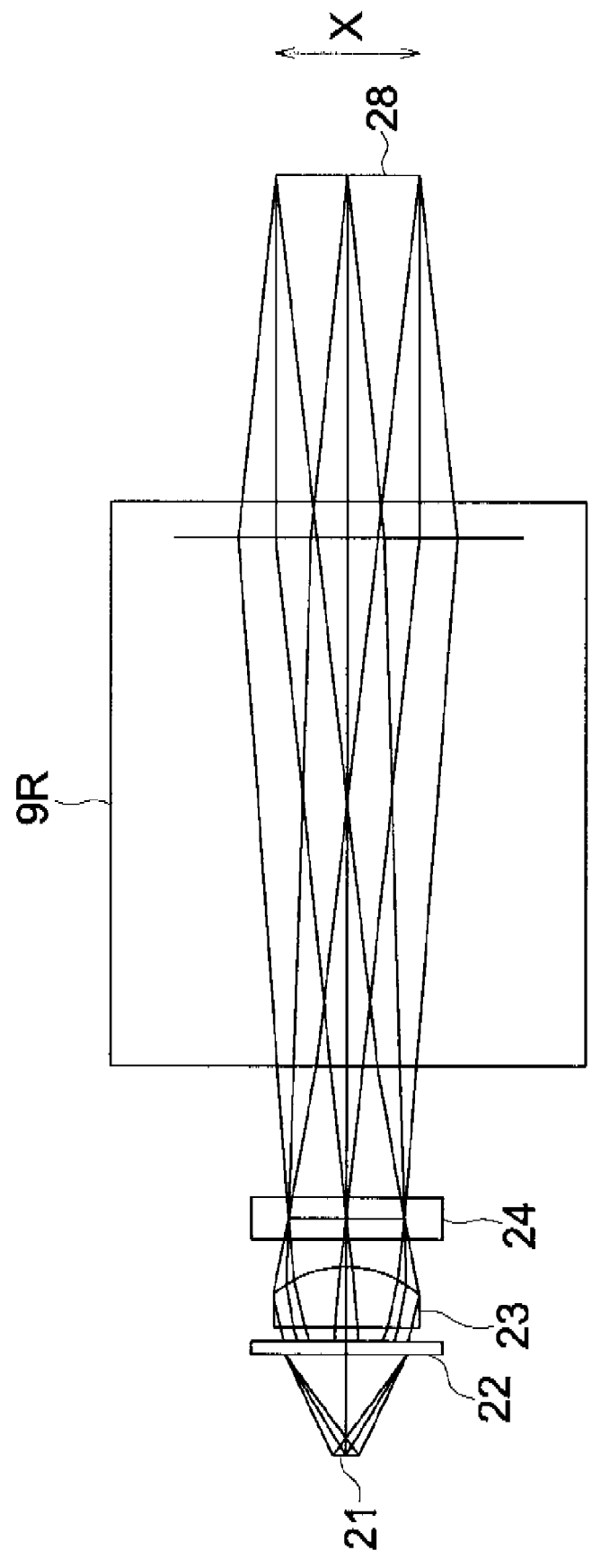
FIG. 6 is an expansion plan wherein the vertical direction is optically straightened in one direction in the cross sectional view of FIG. 5.

FIG. 5 shows an example of the cross sectional view showing the display unit 2R and prism 9R as an eyepiece optical system. The description and illustration of the display unit 2L will be omitted because of the same structure. In FIGS. 5 and 6, x and y denote the directions, wherein x denotes the lateral direction of the user's eye, and y indicates the vertical direction.

As illustrated, the display unit 2R includes a light source 21 made up of an LED (Light-Emitting Diode) and others; a uni-directional diffusion plate 22 for diffusing the light of the light source 21 in one direction; a collective lens 23 made up of a condenser lens and others; and a transmission type display panel 24 made up of an LCD (Liquid Crystal Display). These components are held in an enclosure 20. The collective lens 23 condenses the light from the light source 21. The collective lens 23, light source 21 and display panel 24 serve as display devices. Further, the display panel 24 modulates the light of the light source 21 and displays the image.

When the light source 21 emits the illumination to the uni-directional diffusion plate 22, the uni-directional diffusion plate 22 diffuses the light in one direction, and leads it uniformly to the entire surface of the display panel 24 through the collective lens 23. The display panel 24 arranged at a position inclined with reference to the top surface of the prism 9R displays the image to be led to the user eyes. After that, it receives illumination from the light source 21, and emits the optical image of this image to a first prism 251 of the prism 9R.

The enclosure 20 is provided to sandwich the upper portion of the first prism 251, and covers and holds the uni-directional diffusion plate 22, collective lens 23 and display panel 24.

The prisms 9R and 9L as the eyepiece optical systems includes the first prism 251 as a first optical element, a second prism 252 as a first optical element, and a volume phase holographic optical element 26 (hereinafter referred to as "HOE). These components are formed in an integral structure. The first prism 251 is an optical element capable of totally reflecting the display light from the display units 2R and 2L, and allowing the external world to be viewed by transmission. The second prism 252 is an optical element that offsets the refraction of the first prism 251 to allow transmission of the external light. The first prism 251 and second prism 252 are made up of transparent glass or resin, and are formed in a tabular structure. The volume phase holographic optical element HOE 26 is sandwiched between the first prism 251 and second prism 252 which serve as a holographic substrate.

The volume phase holographic optical element HOE 26 is an eyepiece optical system having an axially asymmetric positive optical power, and is provided with the interference pattern made of the interference fringes that are not parallel to the surface of the holographic substrate. The optical image having entered the volume phase holographic optical element HOE 26 is diffracted and reflected by the diffraction effect of the interference pattern, and is led to the eyes of the user. The volume phase holographic optical element HOE 26 has a high degree of wavelength selectivity, and therefore, the user is allowed to view the external world with a high degree of transmittance.

The display units 2R and 2L are connected to the control apparatus (not illustrated) through the cables 70R and 70L, and are used to display the image according to the instruction from the control apparatus. To be more specific, the image light emitted from the display panel 24 enters the first prism 251 and is reflected three times inside the prism. After that, this light is diffracted by the volume phase holographic optical element HOE 26, and is lead to the user's eyes through the optical pupil 28. Thus, the user is allowed to view the image light as a virtual image.

FIG. 6 is an in-plane view of the optical path in the direction perpendicular to the sheet surface (x-axis direction) of FIG. 5, wherein FIG. 5 is straightened in the direction from the light source 21 to the optical pupil 28. The following describes the optical pupil 28. The optical pupil 28 can be defined as the area wherein the image light led by the prism 9R can be viewed by the user as a virtual image. Accordingly, the optical pupil 28 is required to be larger than a human pupil, and to have an adequate size. In the HMD 1, when the uni-directional diffusion plate 22 is exposed to the RGB as the three primary colors from the light source 21, for example, the uni-directional diffusion plate 22 applies light to the display panel 24 in one direction (in the lateral direction) 40 degrees diffused in terms of half value and half angle. In the present embodiment, the size of the pupil in the X-axis direction is set at 6 mm based on a 40-degree diffusion with reference to the half value and half angle of the uni-directional diffusion plate 22. The size of the human pupil is about 3 mm in one direction. Thus, the size of the optical pupil 28 is 6 mm which is greater than that of the human pupil. This arrangement makes it easier to view the image displayed on the display panel 24.

As described above, when the eyepiece optical system is provided with the volume phase holographic optical element, the image light can be superimposed upon the external light (see-through structure). Since the external light transmittance is high, a bright external world can be viewed. Further, when the volume phase holographic optical element is provided with axially asymmetric positive power, the degree of freedom in the layout of the prisms 9R and 9L can be enhanced. Since a thin structure can be produced, a light-weight and down-sized apparatus can be provided. Further, the image light is reflected inside the prism 9R and is led to the eyes of the user, and the pupil is designed to be smaller in the Y-axis direction. This makes it possible to produce the prism 9R which is as thin as the conventional eyeglasses lens. This allows the user to wear the HMD 1 in close contact with his face, without worrying about thickness of the prisms 9R and 9L. When the HMD 1 is used to watch the movie or the HMD 1 is to be used for a long time, the load on the user's nose and ears is reduced due to the light-weight and down-sized apparatus structure.

Further, when the RGB light emitting surfaces are arranged in the direction wherein there is greater diffusion, the irregularity in the intensity of each color can be reduced on the optical pupil 28. Thus, the color irregularity can be minimized, and hence a bright high-quality image can be provided.

The prism 9R lets the light image of an image in the user's field of view get through and leads it to the user's eye. Accordingly, the image displayed on the display panel 24 superimposed on the image before the prism 9R is led to the user's eyes. In the prism 9R, the refraction by the wedge shape of the first prism 251 can be offset. Thus, the user is allowed to view the external light without being distorted.

Modified Example 1

Figure 7:
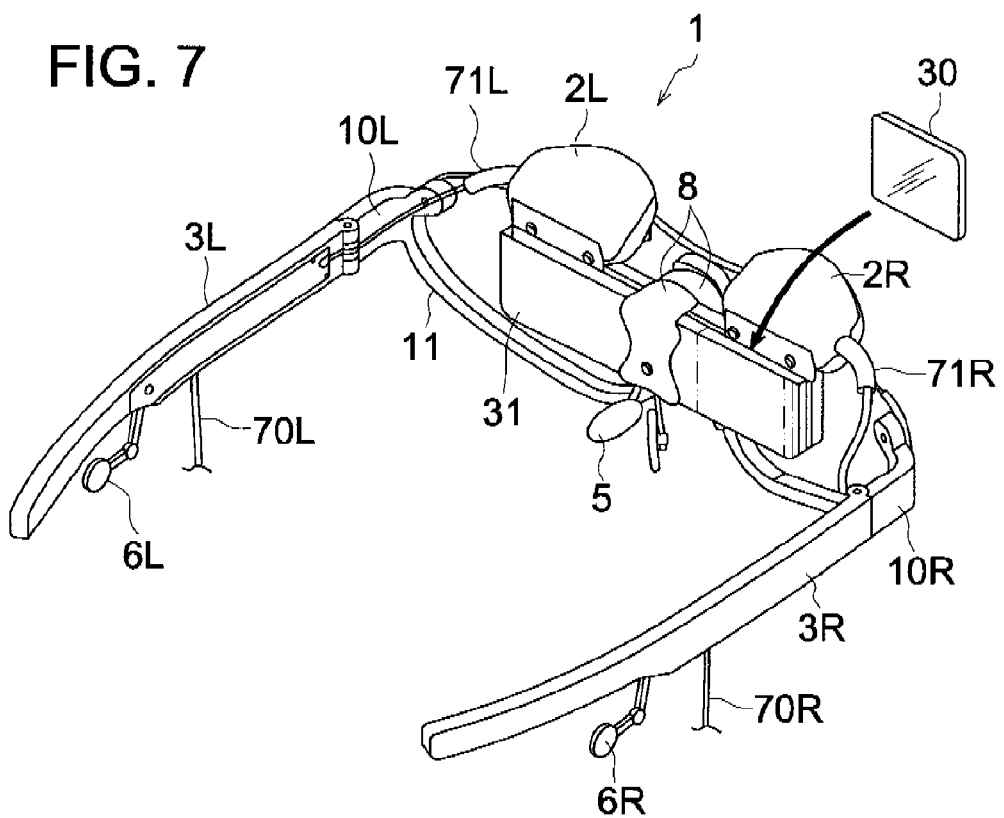
FIG. 7 is a perspective view of a head mounted display according to the Modified Example 1 as viewed from the mounted side.

FIG. 7 shows the HMD 1 as a modified example 1. The same portions will be assigned with the same reference numerals, and the description will be omitted to avoid duplication.

The HMD 1 as the modified example 1 is so designed that it can be used even by a user of poor vision. When the user has a poor vision, the vision must be corrected. For example, the dark transparent plate 4 is replaced by the transparent plate conforming to the vision of the user. However, according to this method, the bright external world can be observed when the dark transparent plate 4 is replaced, but there occurs a problem that the image led from the prisms 9R and 9L is viewed by the naked eyes and is difficult to view clearly. In the HMD 1 of the modified example 1, a dioptric lens conforming to the vision of the user is mounted between the user's eyes and prisms 9R and 9L so that the user's vision is corrected to allow the user to view a clean image at all times.

As illustrated, the dioptric lens supporting member 31 is mounted between the user's eyes and prisms 9R and 9L, and is formed integrally with the prisms 9R and 9L and display units 2R and 2L by means of the connection member 8. The vision corrective lens 30 conforming to the vision of the user is inserted into the dioptric lens supporting member 31, whereby the HMD 1 conforming to the user's vision is provided. It is also possible to make such arrangements that the dioptric lens supporting member 31 is detachable.

As described above, when the dioptric lens is mounted on the HMD 1, the HMD 1 can be used by a user of poor vision. Further, the dioptric lens is mounted closer to the face than the prisms 9R and 9L for leading a image to the eyes. This provides the user with a clear view of the external world as well as a clear view of the image led by the display panel. Further, this dioptric lens can be replaced. Accordingly, the dioptric lens can be adjusted to have the optimum power conforming to each of the users. Thus, any user, independently of personnel differences, can be provided with an HMD 1 characterized by excellent versatility.

Modified Example 2

Figure 8:
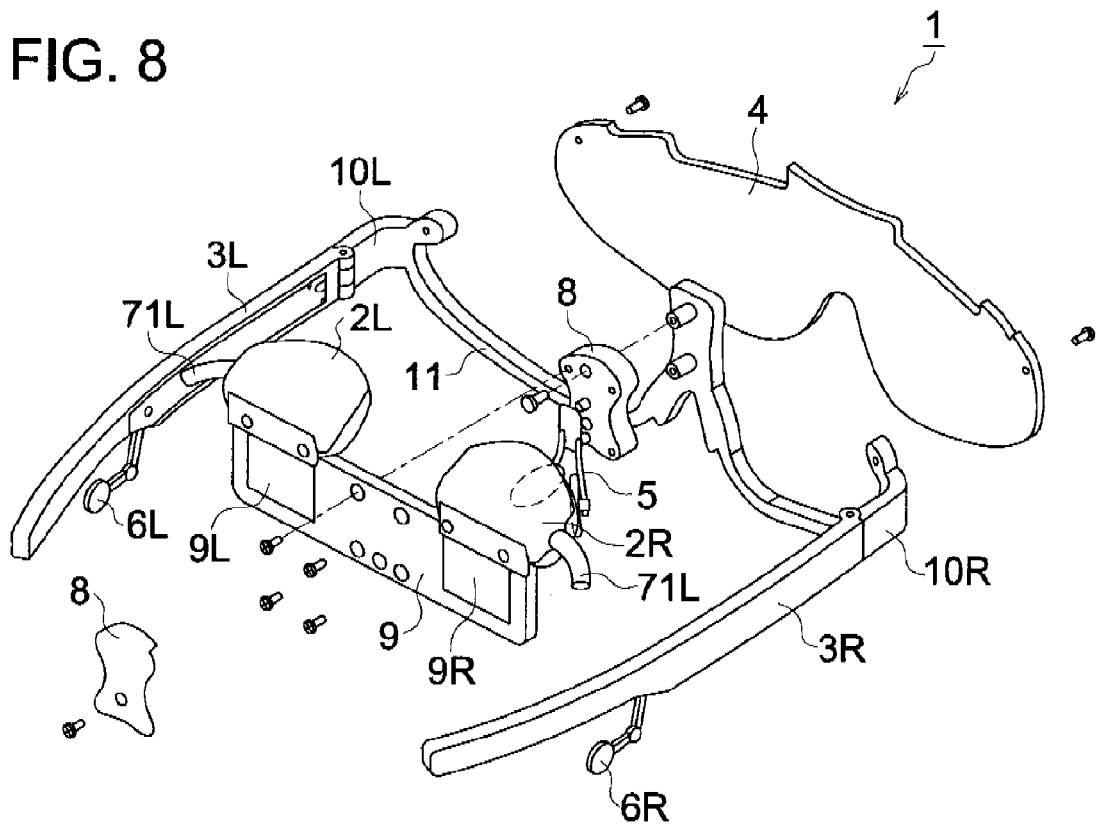
FIG. 8 is an exploded perspective view of a head mounted display according to the Modified Example 2 as viewed from the mounted side.

FIG. 8 shows the HMD 1 as a modified example 2. The same portions will be assigned with the same reference numerals, and the description will be omitted to avoid duplication.

In the HMD 1 as the modified example 2, the prisms 9R and 9L as the right and left eyepiece optical systems are not separate members. To be more specific, as shown in FIG. 8, the prisms 9R and 9L are held as a single member 9. This arrangement reduces the number of components.

Modified Example 3

Figure 9:
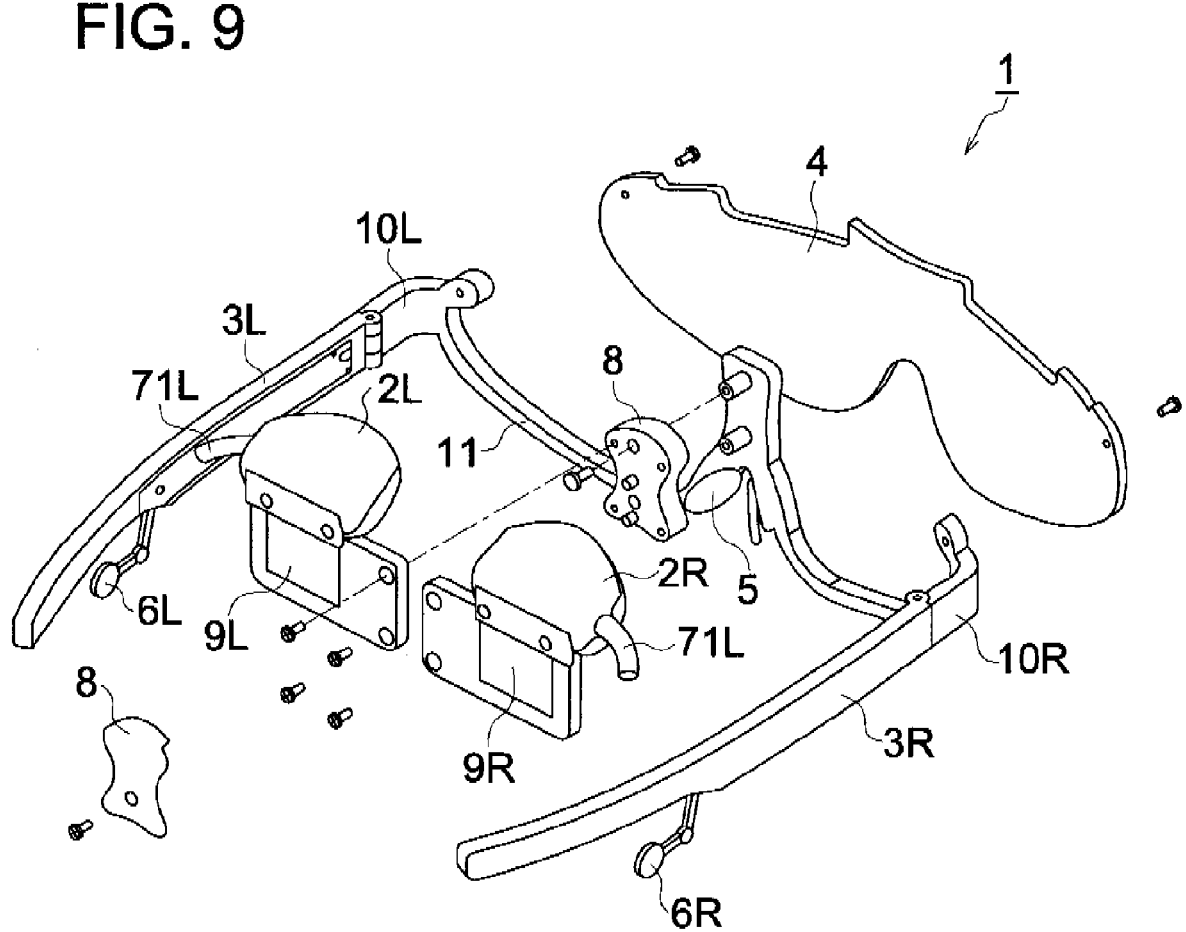
FIG. 9 is an exploded perspective view of a head mounted display according to the Modified Example 3 as viewed from the mounted side.

FIG. 9 shows the HMD 1 as a modified example 3. The same portions will be assigned with the same reference numerals, and the description will be omitted to avoid duplication.

In the HMD 1 as the modified example 3, the nose pad 5 is not a separate member. To be more specific, as shown in FIG. 9, part of the frame 11 is modified to have a function of the nose pad. This arrangement reduces the number of components.

What is claimed is:

1. A head mounted display, comprising:
   a support member; the support member including:
      a pair of lateral frames which are configured to come into contact with both sides of a head of a user; and
      a front frame which is adapted to be provided in front of a face of the user and is configured to come into contact with a nose of the user,
   an image display device for displaying an image;
   an eyepiece optical system adapted to be provided in front of an eye of the user, the eyepiece optical system adapted to combine an external light beam in front of the eye of the user with an image light beam from the image displayed on the image display device into a combined light beam, and adapted to lead the combined light beam to the user's eye;
   a connection section which connects the eyepiece optical system with the front frame at a center position in a lateral direction of the user's face; and
   a transparent plate provided on a counter-face side of the eyepiece optical system so as to cover substantially all the eyepiece optical system when viewed from the counter-face side of the eyepiece optical system, so that the external light beam enters the eyepiece optical system through the transparent plate.

2. The head mounted display of claim 1, wherein a plurality of transparent plates are individually provided for each of right and left eyes of the user.

3. The head mounted display of claim 1, wherein the transparent plate is formed in one piece to cover right and left eyes of the user.

4. The head mounted display of claim 1, wherein a plurality of image display devices are individually provided right and left.

5. The head mounted display of claim 1, wherein the transparent plate is detachably attached.

6. The head mounted display of claim 1, wherein the eyepiece optical system has an optical pupil larger than a pupil of the user's eye.

7. The head mounted display of claim 1, wherein the eyepiece optical system includes:
   a first transparent optical element which is adapted to totally reflect and lead the image light beam to the eye of the user; and
   a second transparent optical element.

8. The head mounted display of claim 1, comprising:
   a volume phase holographic optical element which is adapted to reflect the image light beam from the image to combine the image light beam with the external light beam in front of the user's eye.

9. The head mounted display of claim 8, wherein the holographic optical element has an axially asymmetric positive optical power.

10. The head mounted display of claim 1, comprising:
    a dioptric lens appropriate for vision of the user's eye provided between the eyepiece optical system and the user's eye.

11. The head mounted display of claim 1, comprising:
    an earphone for providing the user with audio information.

12. The head mounted display of claim 1, wherein the eyepiece optical system includes a right eye eyepiece optical system and a left eye eyepiece optical system, and the connection section connects the right eye eyepiece optical system with the left eye eyepiece optical system.

13. The head mounted display of claim 1, comprising:
    a nose pad supported by the connection section,
    wherein the front frame is adapted to come into contact with the user's nose through the nose pad.

14. A head mounted display, comprising:
    a support member; the support member including:
       a plurality of contact portions which are configured to come into contact with a head of a user at three points including a vicinity of a nose of the user,
    an image display device for displaying an image;
    an eyepiece optical system adapted to be provided in front of an eye of the user, the eyepiece optical system adapted to combine an external light beam in front of the eye of the user with an image light beam from the image displayed on the image display device into a combined light beam, and adapted to lead the combined light beam to the user's eye; and
    a connection section which connects the eyepiece optical system with the contact portion which is to come into contact with the head in the vicinity of the user's nose; and
    a transparent plate provided on a counter-face side of the eyepiece optical system so as to cover substantially all the eyepiece optical system when viewed from the counter-face side of the eyepiece optical system, so that the external light beam enters the eyepiece optical system through the transparent plate.

15. The head mounted display of claim 14, wherein a plurality of the image display devices are individually provided right and left.

16. The head mounted display of claim 14, wherein the eyepiece optical system includes:
    a first transparent optical element which is adapted to totally reflect and lead the image light beam to the eye of the user; and
    a second transparent optical element.

17. The head mounted display of claim 14, comprising:
    a volume phase holographic optical element which is adapted to reflect the image light beam from the image to combine the image light beam with the external light beam in front of the user's eye.

18. The head mounted display of claim 14, comprising:
a dioptric lens appropriate for vision of the user's eye provided between the eyepiece optical system and the user's eye.

19. The head mounted display of claim 14, wherein the eyepiece optical system includes a right eye eyepiece optical system and a left eye eyepiece optical system, and the connection section connects the right eye eyepiece optical system with the left eye eyepiece optical system.

20. The head mounted display of claim 14, wherein the contact portion which is adapted to come into contact with the head in the vicinity of the nose of the user includes a nose pad, and the support member is adapted to come into contact with the user's nose through the nose support member.

21. The head mounted display of claim 1, wherein the eyepiece optical system, the connection section, and the front frame are arranged in this order from the eye of the user toward the transparent plate.

22. A head mounted display, comprising:
a support member; the support member including:
  a pair of lateral frames which are configured to come into contact with both sides of a head of a user; and
  a front frame which is adapted to be provided in front of a face of the user and is configured to come into contact with a nose of the user,
an image display device for displaying an image;
an eyepiece optical system adapted to be provided in front of an eye of the user, the eyepiece optical system adapted to combine an external light beam in front of the eye of the user with an image light beam from the image displayed on the image display device into a combined light beam, and adapted to lead the combined light beam to the user's eye;
a connection section which connects the eyepiece optical system with the front frame at a center position in a lateral direction of the user's face;
a dioptric lens adapted to correct vision of the user's eye provided between the eyepiece optical system and the user's eye; and
a dioptric lens supporting member for supporting the dioptric lens, the dioptric lens supporting member being attached to the connection section in a vicinity of a center position in a lateral direction of the user's face.

23. A head mounted display, comprising:
a support member; the support member including:
  a pair of lateral frames which are configured to come into contact with both sides of a head of a user; and
  a front frame which is adapted to be provided in front of a face of the user and is configured to come into contact with a nose of the user,
an image display device for displaying an image;
an eyepiece optical system adapted to be provided in front of an eye of the user, the eyepiece optical system adapted to combine an external light beam in front of the eye of the user with an image light beam from the image displayed on the image display device into a combined light beam, and adapted to lead the combined light beam to the user's eye;
a connection section which connects the eyepiece optical system with the front frame at a center position in a lateral direction of the user's face; and
a dioptric lens adapted to correct vision of the user's eye provided between the eyepiece optical system and the user's eye;
wherein the dioptric lens is detachably supported.

24. The head mounted display of claim 1, wherein the transparent plate is mounted on the front frame.

25. The head mounted display of claim 14, wherein the transparent plate is mounted on the front frame.

26. The head mounted display of claim 1, wherein the transparent plate and the eyepiece optical system are facing each other with an air layer therebetween.

27. The head mounted display of claim 14, wherein the transparent plate and the eyepiece optical system are facing each other with an air layer therebetween.

* * * * *